Patented May 12, 1925.

1,537,865

UNITED STATES PATENT OFFICE.

HAROLD A. MORTON, OF AKRON, OHIO, ASSIGNOR TO THE MILLER RUBBER COMPANY, OF AKRON, OHIO, A CORPORATION OF OHIO.

METHOD OF MAKING PATCHES FOR RUBBER GOODS.

No Drawing.   Application filed June 4, 1924.   Serial No. 717,897.

*To all whom it may concern:*

Be it known that I, HAROLD A. MORTON, a citizen of the United States, and resident of Akron, in the county of Summit and State of Ohio, have invented certain new and useful Improvements in Methods of Making Patches for Rubber Goods, of which the following is a specification.

My present invention relates to an improved method of manufacturing a tire patch and aims to provide a patch composed of two layers or plies of homogeneously united rubber, one ply being vulcanized and forming a backing carrier, and the other ply being unvulcanized and hence tacky and capable of being easily applied to the tire without the use of heat to effect a closing of the puncture, but which when desired, can be vulcanized to the tire by the application of requisite heat where heating means are available, to effect a more permanent union.

The invention also aims to provide a method by which such patch may be expeditiously manufactured without danger of burning or prevulcanization.

With these several objects in view, the invention includes the novel process herein described and defined in and by the appended claims.

In the production of vulcanized rubber it has been customary to use what are termed ultra accelerators which in the presence of zinc oxide or other zinc salts, greatly reduce the temperature required for, and expedite the vulcanization. Great care has been required, however, in the use of these to prevent pre-vulcanization or burning on the mill or calender. I have found that certain of the zinc salts are non-migratory, and this fact, coupled with the migratory qualities of sulphur and certain of the accelerators, I make use of to carry out my improved process.

This consists, briefly, in mixing two separate batches or stocks, one containing rubber and a non-migratory zinc salt, and the other sulphur and a migratory accelerator of low activity in the absence of zinc salts but which is rendered more active by the presence of zinc.

Due to the low activity in the absence of zinc of the accelerator employed, this batch may be easily milled and calendered to sheet form without danger of burning, while the zinc containing stock, per se, is incapable of vulcanization. A ply of one stock is then superimposed on a ply of the other stock and subjected to heat in a dry hot oven, or the like, whereupon the sulphur and accelerator will migrate into the ply containing the non-migratory zinc, which latter ply will be capable of being cured by the low temperature by the action of the migrating sulphur and accelerator and the zinc compound, it being understood that the temperature of the oven is kept below the curing point of the stock containing the sulphur and accelerator, and this stock or layer being maintained uncured by reason of the lack of migration of the zinc salt, although the two layers will be firmly adherent at their line of junction.

As a specific example of this process, the following is given:—

Stock A—First latex rubber_____ 98
        Zinc oxide_____ 2
Stock B—First latex rubber_____ 97.75
        Sulphur_____ 1.50
        Dimethyl amine carbon
         bisulphide addition
         product_____ 0.75

A sheet of stock B of $\frac{1}{32}''$ thickness is then run through the calender on holland. On top of stock B a ply of stock A of $\frac{1}{32}''$ thickness is run. This laminated sheet is then rolled up and suspended in a hot oven at a temperature of approximately 150° F. for a period of ten hours, whereupon it is found that stock B is completely uncured and stock A is fully cured.

It will be understood that the foregoing is given by way of example only, and that I do not limit myself to this specific example, as any other migratory low temperature curing organic accelerator may be used, which is rendered more active in the presence of zinc salt, and also any other non-migratory zinc salt may be used as an activator for the accelerator, such for example, as zinc sulphate and zinc phosphate.

Having thus described my invention, what I claim is:—

1. The hereindescribed method of forming a sheet of patching material, which consists in providing a layer of rubber compound containing sulphur and a migratory organic accelerator but no zinc, and a second layer of rubber compound containing a non-migratory activator for the accelerator, juxtaposing said sheets and subjecting the same to a temperature below that at which the layer containing the sulphur and accelerator would vulcanize.

2. The hereindescribed method of forming a sheet of patching material, which comprises providing two separate sheets of rubber compound, one containing sulphur and an organic accelerator which is rendered more active in the presence of zinc but no zinc activator, and the other containing rubber and a non-migratory zinc activator, superimposing said sheets one on the other and subjecting the same to a temperature which will cure the zinc containing layer, while leaving the other layer unvulcanized.

In testimony whereof, I affix my signature.

HAROLD A. MORTON.